(12) United States Patent
Khan et al.

(10) Patent No.: US 8,750,132 B2
(45) Date of Patent: Jun. 10, 2014

(54) METHOD AND APPARATUS FOR COMPLETING A CALL IN A NETWORK WITH ENUM FAILURE

(75) Inventors: Arshad Khan, Austin, TX (US); Bernard Ku, Austin, TX (US); Niral Sheth, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 652 days.

(21) Appl. No.: 12/336,432

(22) Filed: Dec. 16, 2008

(65) Prior Publication Data

US 2010/0149995 A1    Jun. 17, 2010

(51) Int. Cl.
*G01R 31/08* (2006.01)
*H04L 12/26* (2006.01)

(52) U.S. Cl.
CPC .................................... *H04L 43/00* (2013.01)
USPC ......................................................... 370/242

(58) Field of Classification Search
CPC ........ H04L 43/00; H04L 43/50; H04W 24/00
USPC ......... 370/241, 242, 244, 351, 389, 400, 410, 370/352, 354, 464, 498, 522; 709/227, 228, 709/229
See application file for complete search history.

(56) References Cited

U.S. PATENT DOCUMENTS

| | | | |
|---|---|---|---|
| 7,509,425 B1 * | 3/2009 | Rosenberg ..................... | 709/227 |
| 2006/0153166 A1 * | 7/2006 | Kobayashi et al. ........... | 370/352 |
| 2007/0019623 A1 * | 1/2007 | Alt et al. ....................... | 370/352 |
| 2008/0098117 A1 * | 4/2008 | Fukuhara et al. ............. | 709/227 |
| 2008/0232352 A1 * | 9/2008 | Terrill et al. .................. | 370/352 |
| 2008/0247384 A1 * | 10/2008 | Arauz-Rosado et al. ..... | 370/352 |
| 2009/0067439 A1 * | 3/2009 | Yamamoto et al. ........... | 370/400 |
| 2009/0245098 A1 * | 10/2009 | Baker et al. ................... | 370/221 |

* cited by examiner

*Primary Examiner* — Obaidul Huq

(57) ABSTRACT

A method and an apparatus for processing a session request in a network are disclosed. For example, the method receives the session request by a Serving-Call Session Control Function (S-CSCF), and sends a query to a tElephone NUmbering Mapping (ENUM) server for the session request. The method determines if a response is received to the query to the ENUM server, and inserts an indication of a component failure in a header of the session request if the response is not received from the ENUM server, wherein the indication of the component failure indicates a non-responsive ENUM server.

18 Claims, 5 Drawing Sheets

METHOD AND APPARATUS FOR COMPLETING A CALL IN A NETWORK WITH ENUM FAILURE

The present invention relates generally to communication networks and, more particularly, to a method and apparatus for completing a call in a network, e.g., an Internet Protocol (IP) network, a Voice over Internet Protocol (VoIP) network, and the like.

BACKGROUND OF THE INVENTION

A customer expects to have a call be completed regardless of a failure or a degradation condition that may exist in the service provider's network. For example, a customer may subscribe to a VoIP service and expect his/her VoIP calls to be completed regardless of server failures or degradations in the VoIP network. A typical network comprises numerous types of devices, placed in the network to perform specific tasks. Some of these network devices are essential for completing a call while others are considered nonessential for call completion. For example, an ENUM (tElephone NUmbering Mapping) server provides information for routing a call but does not participate in call completion. However, the call may still fail to be completed due to a failure to receive a response from an ENUM server.

SUMMARY OF THE INVENTION

In one embodiment, the present invention discloses a method and an apparatus for processing a session request in a network. For example, the method receives the session request by a Serving-Call Session Control Function (S-CSCF), and sends a query to a tElephone NUmbering Mapping (ENUM) server for the session request. The method determines if a response is received to the query to the ENUM server, and inserts an indication of a component failure in a header of the session request if the response is not received from the ENUM server, wherein the indication of the component failure indicates a non-responsive ENUM server.

In one embodiment, the method receives a session request from a Serving-Call Session Control Function (S-CSCF), wherein the session request comprises an indication of a component failure in a header of the session request, wherein the indication of the component failure indicates a non-responsive ENUM server. The method then sends a query to a Home Subscriber Server (HSS) to obtain domain information of a called party of the session request, and strips the indication of the component failure in the header from the session request, and routes the session request in accordance with the domain information, if the domain information is received from the HSS.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for completing a call in a network. Although the present invention is discussed below in the context of an IP network, e.g., an Internet Protocol (IP) Multimedia Subsystem (IMS) networks, the present invention is not so limited. Namely, the present invention can be applied to packet networks in general, e.g., Voice over Internet Protocol (VoIP) networks, Service over Internet Protocol (SoIP) networks, and the like.

Figure 1:
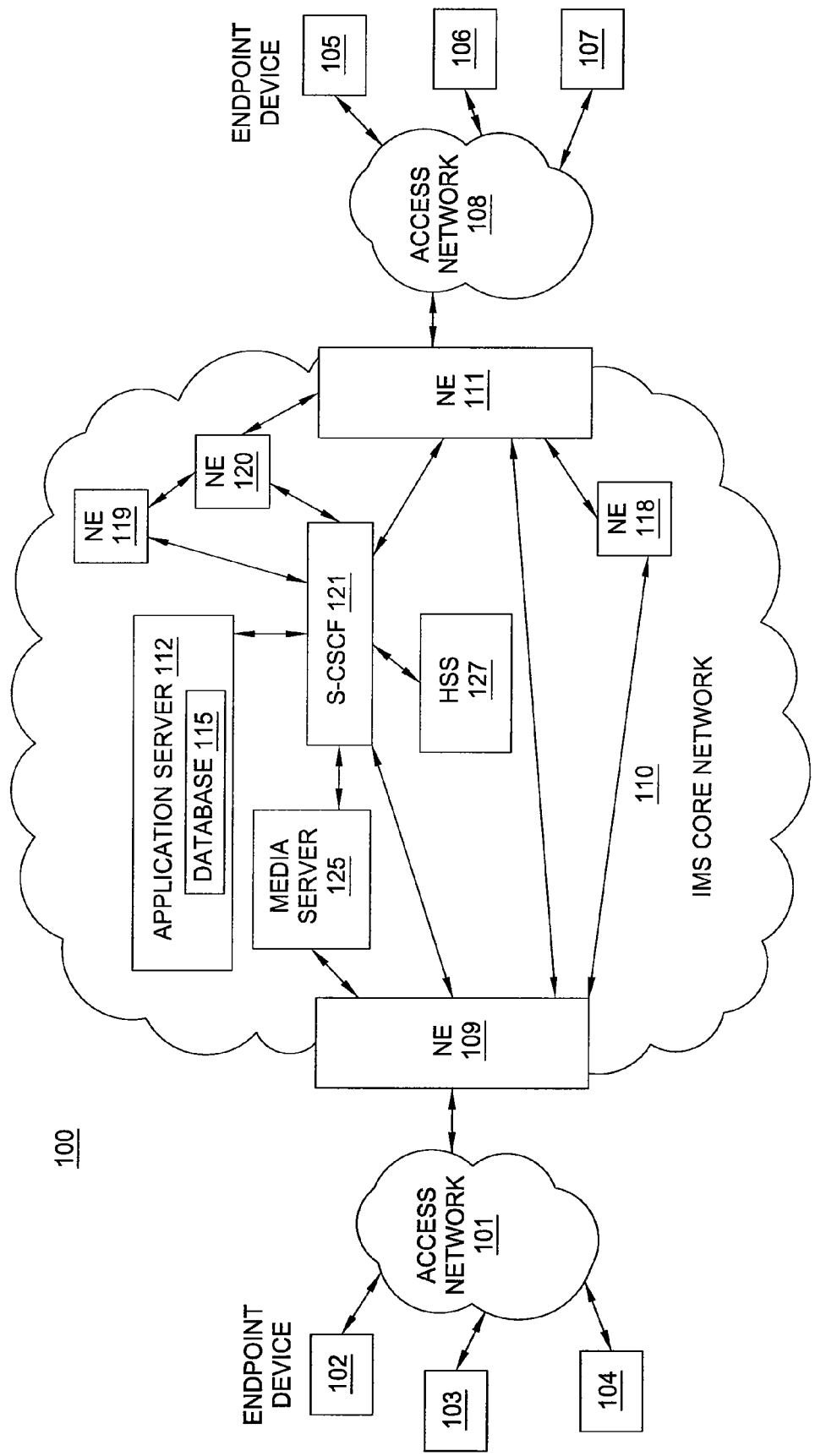
FIG. 1 illustrates an exemplary network related to the present invention.

To better understand the present invention, FIG. 1 illustrates an example network 100, e.g., an Internet Protocol (IP) Multimedia Subsystem network related to the present invention. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving—Call Session Control Function (S-CSCF) 121, a Media Server (MS) 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g. VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g. various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present invention.

The above IP network is described to provide an illustrative environment in which packets for voice, data, and multimedia services are transmitted on IP Multimedia Subsystem (IMS) networks. A customer may subscribe to a VoIP service and expect his/her VoIP calls to be completed regardless of server failures or degradations in the VoIP network. For example, in IMS networks, an ENUM (tElephone NUmbering Mapping) server may be used to determine routing information (e.g., determining a home domain and how a call is to be routed) for a called party. If the ENUM server has a failure condition or a time-out condition, then the call will fail to be completed. However, although there is a failure with the ENUM server, the rest of the core components of the IMS network may be available and are perfectly capable of completing the call for the customer. Under this illustrative scenario, the customer will be dissatisfied with the service.

In one embodiment, the current method provides a method for completing a call whether or not the ENUM has a failure and/or degradation. In order to more clearly describe the current invention, the following networking terminologies are first provided.

E.164; and

ENUM (tElephone NUmbering Mapping).

E.164 refers to an ITU (International Telecommunications Union)-T recommendation which defines the international public telecommunication numbering plan for formatting telephone numbers such that they may be signaled across one or more networks. The E.164 format includes a country code and subsequent digits, but not the international prefix.

ENUM refers to a standard protocol defined by the Internet Engineering Task Force (IETF) for translating phone numbers that are in E.164 format to Internet domain names such that a Domain Name Server (DNS) may resolve the IP addresses for E.164 numbers the same way it resolves traditional website domains. For example, ENUM may be used to transform a phone, a fax or a pager number into a URI (Uniform Resource Identifier).

In order to translate a phone number to an Internet Domain name, the phone number is first provided in an E.164 format. Specifically, the phone number is first translated or converted to a full E.164 formatted number. For example, the original phone number may not have indicated a country code, area code, etc. However, an E.164 formatted phone number includes a country code, area code and the specific number within the area code. For example, "1" is the country code for all phone numbers in the United States of America (USA). If the original USA phone number is 987-555-1234, it is translated to an E.164 formatted number yielding 1-987-555-1234. The E.164 number is then reduced to digits only, e.g., 19875551234. The digits are then reordered back to front, e.g. 43215557891. Once the digits are reordered, dots are placed between each digit and the Internet domain e164.arpa is added to the end. For the above example, the resulting Internet domain is 4.3.2.1.5.5.5.7.8.9.1.e164.arpa.

In operation, an ENUM server may then be queried by the S-CSCF of the calling party to resolve on the domain name 4.3.2.1.5.5.5.7.8.9.1.e164.arpa. For example, an IP Multimedia Subsystem (IMS) network may use an ENUM server to resolve phone number that is in E.164 format, i.e., the contact information of the phone number. The S-CSCF of the calling party may then query a DNS for the regular routing of the contact information resided in the NAPTR (Naming Authority Pointer) resource records, e.g., the SIP URI. In sum, the S-CSCF of the calling party will send the ENUM query and the ENUM server will return the NAPTR resource records if the E.164 number is registered, wherein the S-CSCF then queries the DNS for the destination of the returned records, e.g., the SIP URI of the called party.

It should be noted that the customer may have a set of NAPTR resource records. For example, the customer may have a SIP address, a telephone number, a presence service number, an email address, etc. The query may then retrieve the set of NAPTR resource records for the customer. Table 1 below provides an illustrative example of a query and a response for the above phone number.

TABLE 1

| Query | ORIGIN 4.3.2.1.5.5.5.7.8.9.1.e164.arpa | |
|---|---|---|
| Response | IN NAPTR 100 10 "u" "E2U+SIP" "!^.*$!sip:user@example.com!" | Active |
| | IN NAPTR 100 20 "u" "E2U+pres" "!^.*$!pres:user@example.com!" | Active |
| | IN NAPTR 100 30 "u" "E2U+mailto" "!^.*$!mailto:user@example.com!" | Inactive |

It should be noted that Table 1 above illustrates a response having a plurality of NAPTR resource records. In this illustrative example, each NAPTR resource record contains information pertaining to an order (e.g., represented by the value "100") followed by a preference (e.g., represented by the values "10", "20", and "30"). In one embodiment, the NAPTR resource records are organized based on the order field and the preference field, e.g., from a lowest order value to a highest order value and from a lowest preference value to a highest preference value. For example, in operation, the lowest value (e.g., "10" in this example) in the preference field will be executed first and then followed by the next lowest preference field (e.g., "20" in this example), and so on. This approach allows a call to be directed to a plurality of possible destinations based upon a preferred order or sequence that can be selectively set by the user.

Furthermore, in one embodiment, each NAPTR resource record may also have an activation field that indicates whether a NAPTR resource record is "active" or "inactive." An "active" field indicates that the NAPTR resource record can be used, whereas an "inactive" field indicates that the NAPTR resource record should not be used. Again, this approach allows a user to selectively activate or deactivate a NAPTR resource record. For example, a user may be travelling on a business trip for an extended period of time and does not want calls directed to the user's home number while the user is travelling. As such, the user can selectively designate a NAPTR resource record associated with the user's home number to be "inactive", during the business trip. Upon return from the business trip, the user can selectively designate the NAPTR resource record associated with the user's home number to be "active" again.

If the S-CSCF of the calling party receives a successful response to the query (queries) sent to the ENUM and DNS, the S-CSCF then routes the call to the Interrogating-Call Session Control Function (I-CSCF) of the returned domain for termination. That is, the S-CSCF routes the call to the I-CSCF handling the destination of the returned record. The I-CSCF may then interrogate the HSS to determine the S-CSCF of the called party. If the HSS then returns a Serving-Call Session Control Function Fully Qualified Domain Name (S-CSCF FDQN) (broadly referred to as domain information) of the called party, the I-CSCF routes the incoming session request (SIP INVITE message) to the S-CSCF of the called party for completion. This is broadly referred to as a normal procedure for processing a session request.

If the S-CSCF of the calling party fails to receive a successful response to the query (queries) sent to the ENUM and DNS, the S-CSCF either rejects the call or assumes that the called party is a customer of a Public Switched Telephone Network (PSTN). If the S-CSCF assumes that the called party is a customer of a PSTN, then the S-CSCF of the calling party forwards the call to the PSTN network via a Border Gateway Control Function (BGCF) and/or Media Gateway Control Function (MGCF). If the called party is indeed a customer of the PSTN, then the call may successfully complete. However, if the called party was in fact a customer of the IMS network (e.g., a VoIP customer), the call fails to complete.

In one embodiment, the current method provides call completion in networks. Specifically, the method provides a header, e.g., a SIP header, that includes an indication of a component failure. For example, the indication of the component failure may include a numerical value that corresponds to the failures of different network components. In one embodiment, the network service provider may assign numerical values to different components in the network that are considered non-essential for completing a call. If a network component that is considered non-essential for completing a call fails, the method may then insert the appropriate component failure indication that corresponds to the specific component. For example, if the network service provider assigns the ENUM server the number "1" and the ENUM server fails, then the SIP header may then include an indication of a component failure with the failed component identified in the SIP header. For example, the SIP header may include the value of "1" to indicate a failure of the ENUM server.

In one embodiment, the current method enables the S-CSCF of a calling party to insert the above indication of a component failure in the SIP header of the SIP INVITE message when a query sent to the ENUM server times out, and then to forward the SIP INVITE message to the home I-CSCF of the calling party. That is, when an S-CSCF of a calling party receives a SIP INVITE message from a user endpoint device, the S-CSCF of the calling party queries the ENUM server. If the query sent to the ENUM server times out, then instead of either rejecting the call or sending it to the PSTN, the S-CSCF of the calling party may forward the SIP INVITE message to the home I-CSCF (I-CSCF of its own domain) with the indication of the component failure set to indicate that the ENUM server has failed.

In one embodiment, the current method also enables the I-CSCF to receive and process SIP INVITE messages that include an indication of a component failure. Specifically, the I-CSCF may receive a session request that may include an indication of a component failure. The I-CSCF will then interrogate the HSS to determine the S-CSCF of the called party. If the called party is in a domain served by the HSS, the HSS may then successfully return an S-CSCF FDQN of the called party. Otherwise, the method determines that the called party is not a subscriber of a service in the same domain (e.g., the called party is not a VoIP customer).

In one embodiment, the current method enables an I-CSCF that receives a successful S-CSCF FDQN from the HSS, to strip the indication of a component failure, if present, from a session request and then to route the session request to the S-CSCF of the called party for completion. For example, the method may modify the incoming SIP INVITE message to remove an indication of a component failure, if present. The method may then forward the SIP INVITE message (without the indication of a component failure) to the S-CSCF of the called party in accordance with the received S-CSCF FDQN.

In one embodiment, the current method enables an I-CSCF that fails to receive an S-CSCF FDQN from the HSS, to determine if the session request includes an indication of a component failure. If the session request does not include the indication of a component failure, then the I-CSCF may reject the call. For example, the I-CSCF may respond to the S-CSCF indicating that the called party is not in the domain of the I-CSCF.

If the session request includes the indication of a component failure, the I-CSCF may then determine if the indication is for the ENUM server. For example, the I-CSCF determines if the numerical value provided in the indication correlates to the number assigned for the ENUM server. If the indication of the component failure is that of the ENUM server, the I-CSCF may then strip the indication of the component failure from the session request and forward the request to the PSTN for completion, via the BGCF and MGCF. If the indication of the component failure is that of another device, then the I-CSCF may either reject the call or provide a response to the S-CSCF.

Figure 2:
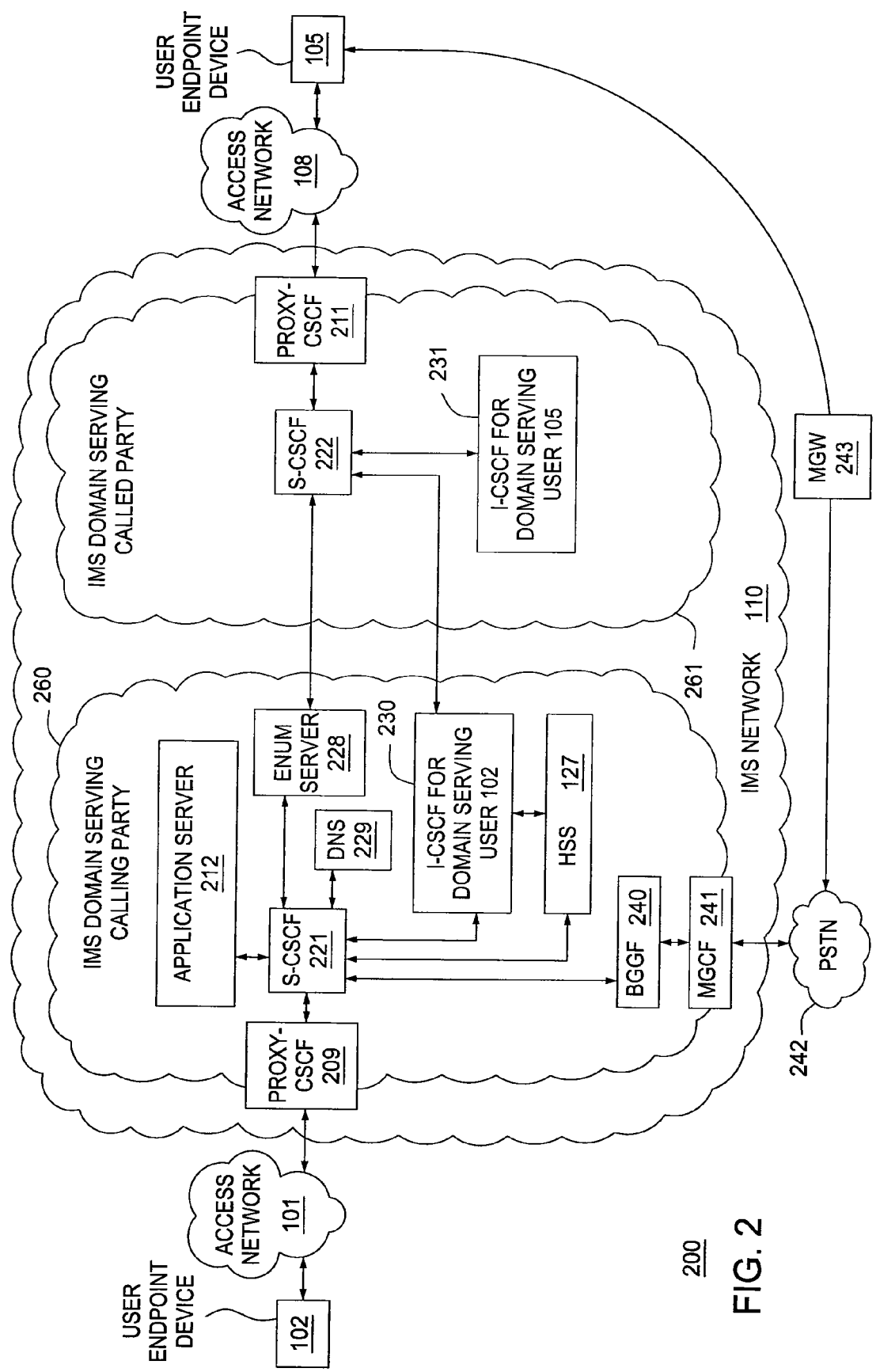
FIG. 2 illustrates an exemplary network in accordance with one embodiment of the current invention for completing a call in a network.

FIG. 2 illustrates an exemplary network 200 in accordance with one embodiment of the current invention for completing a call. In one embodiment, the network 200 comprises User Endpoint (UE) devices 102 and 105 communicating with an IMS network 110 via access networks 101 and 108, respectively. For illustration, the IMS network 110 comprises domains 260 and 261. It should be noted that the IMS network 110 may comprise any number of domains.

In one embodiment, the IMS domain 260 comprises a P-CSCF 209, a BGCF 240, a MGCF 241, a HSS 127, a S-CSCF 221, an I-CSCF 230 for domain 260, an ENUM server 228, a DNS 229, and an application server 212, interconnected for providing services to customers. Similarly, the IMS domain 261 comprises a P-CSCF 211, a S-CSCF 222 and an I-CSCF 231, interconnected for providing services to the customers. For example, the domain 260 and domain 261 may support various services (e.g., VoIP service, streaming video services, cellular services, etc.). It should be noted that the IMS domain 261 may employ similar network components to those of domain 260, but they are omitted to simplify the present disclosure. The customer with UE 102 is served by the domain 260 and the customer with UE 105 is served by the domain 261. Specifically, P-CSCF 209, S-CSCF 221 and I-CSCF 230 are used for serving UE 102, and P-CSCF 211, S-CSCF 222 and I-CSCF 231 are used for serving UE 105. The BGCF 240 and MGCF 241 are used by network devices in domain 260 to route calls to the PSTN 242.

If UE 102 initiates a session towards UE 105 (e.g., sending a SIP INVITE message), then the S-CSCF 221 receives the session request via P-CSCF 209. The S-CSCF 221 may then send a query for NAPTR resource records to the ENUM server 228. The ENUM server 228 may then return the NAPTR resource records if the E.164 number is registered. The S-CSCF 221 may then query the DNS 229 for the destination of the returned NAPTR records, e.g., the SIP URI of the called party.

Thus, if the S-CSCF 221 receives a successful response to the query (queries) sent to the ENUM 228 and DNS 229, the S-CSCF 221 then routes the call to the pertinent I-CSCF accordingly. Otherwise, in one embodiment, the S-CSCF 221 inserts an indication of a component failure in the header of the session request (e.g., in the header of the SIP INVITE message) indicating that the ENUM server 228 has failed if the ENUM server 228 was unresponsive (e.g., due to a failure or a time out event). The S-CSCF 221 then forwards the session request to the I-CSCF 230.

In one embodiment, the I-CSCF 230 may then receive and process the session request (e.g., the SIP INVITE message that includes an indication of an ENUM failure). Specifically, the I-CSCF 230 receives the session request and interrogates the HSS 127 to determine the S-CSCF of the called party. If the called party is in a domain served by the HSS 127, the HSS 127 may then successfully return an S-CSCF FDQN of the called party. The I-CSCF 230 may then receive the S-CSCF FDQN from the HSS 127, strips the indication of the component failure from the session request, and then routes the session request to the S-CSCF of the called party for completion, in accordance with the received S-CSCF FDQN.

In one embodiment, if the called party is not in the same domain served by the HSS 127, then the S-CSCF FDQN will not be found. The I-CSCF 230 may then determine if the session request includes an indication of a component failure. If the session request does not include the indication of a component failure, then the I-CSCF may reject the call. If the session request includes the an indication of a component failure, the I-CSCF 230 may then determine if the indication is for the ENUM server. If the indication of the component failure is that of the ENUM server, the I-CSCF 230 may then strip the indication of the component failure from the session request and forwards the request to the PSTN 242 for completion. For example, the PSTN 242 communicates with the UE 105 via a Media Gateway (MGW) 243. The MGW 243 is used for converting the data from a format required in the PSTN to a format required in the IP network, and vice versa. For example, data sent from the PSTN 242 to the UE 105 is converted by the MGW 243 to a format required by the IP network. Similarly, data sent from the UE 105 to the PSTN 242 is converted by the MGW 243 to a format required by the PSTN 242.

For the example in FIG. 2, UE 105 is not served by HSS 127. Hence, an S-CSCF FDQN will not be successfully located by the HSS 127. The I-CSCF 230 may then determine that the session request received from the S-CSCF 221 includes an indication of a component failure, with the value set to that of the ENUM server 228. Then, the I-CSCF 230 strips the indication of the component failure from the session request and forward request to the PSTN 242 for completion, via the BGCF 240 and MGCF 241. The PSTN may then forward the request to the UE 105 via the MGW 243.

In one embodiment, the current method may enable an I-CSCF that receives an unsuccessful response to an HSS query, to forward the unsuccessful response to the S-CSCF of the calling party. For the example in FIG. 2, if I-CSCF 230 fails to obtain a S-CSCF FDQN from the HSS 127, then the I-CSCF 230 may send a response to the session request received from S-CSCF 221 indicating that the address is not in the domain of the HSS. The S-CSCF 221 may then perform the forwarding of the session request to the PSTN. That is, instead of the session request being forwarded to the PSTN directly by the I-CSCF, the information may be provided to the S-CSCF such that the S-CSCF is able to forward the session request to the PSTN.

Figure 3:
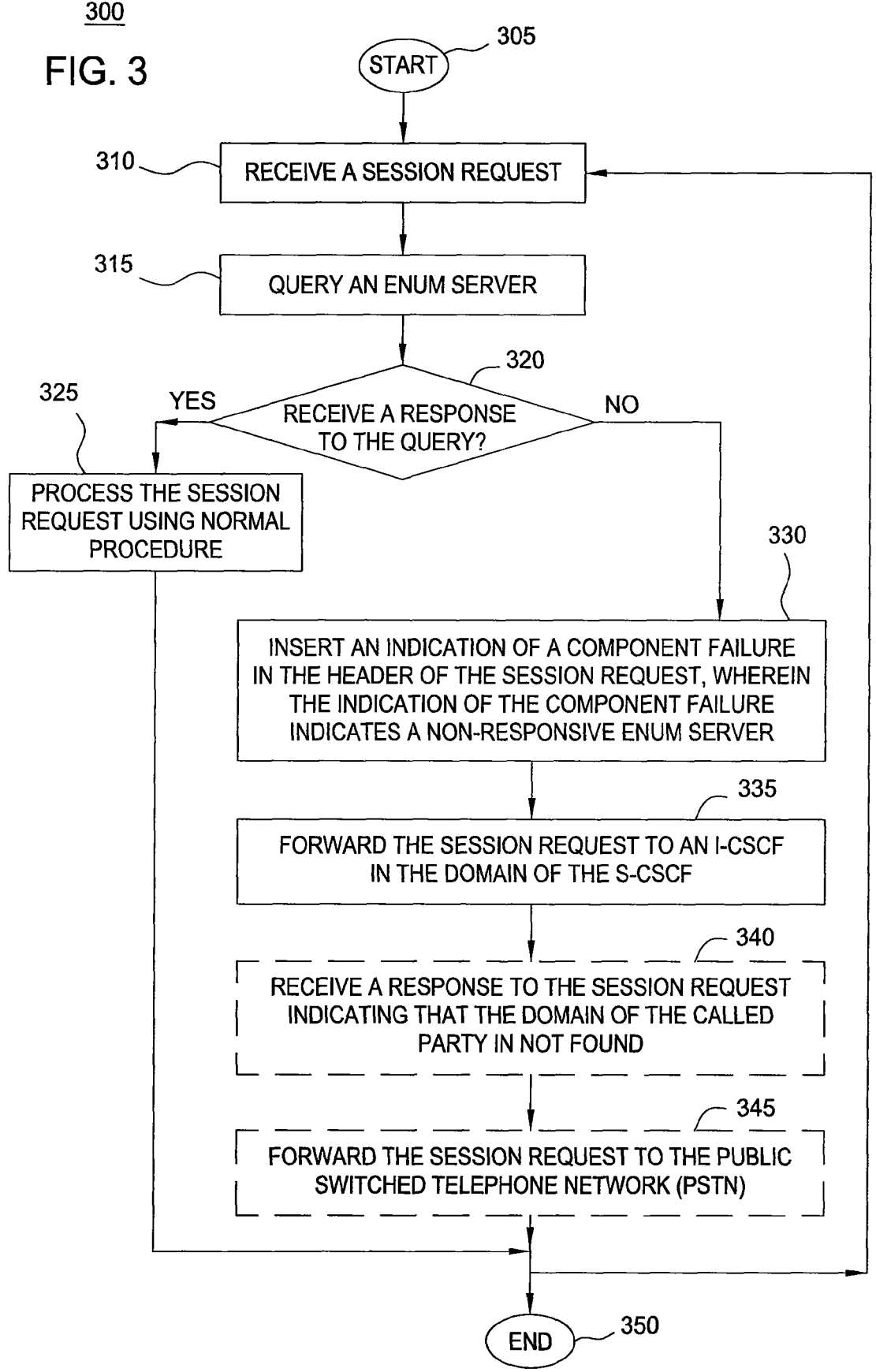
FIG. 3 illustrates a flowchart of a method for an S-CSCF completing a call in a network.

FIG. 3 illustrates a flowchart of a method 300 for an S-CSCF completing a call in a network. Method 300 starts in step 305 and proceeds to step 310.

In step 310, method 300 receives a session request. For example, an S-CSCF may receive a SIP INVITE message from a subscriber of a VoIP service through a proxy-CSCF.

In step 315, method 300 queries an ENUM server. For example, the method may query the ENUM server for a NAPTR record, which then may be used to query a DNS for the destination of the returned NAPTR record, e.g., the SIP URI associated with a called party.

In step 320, method 300 determines if a response is received to the query sent to the ENUM server. If a response is received from the ENUM server, the method proceeds to step 325. Otherwise, the method proceeds to step 330.

In step 325, method 300 processes the session request using a normal procedure as discussed above. For example, if the ENUM server sends a NAPTR record, the S-CSCF may query the DNS for the destination of the returned NAPTR record and so on. The method then proceeds to step 350.

In step 330, method 300 inserts an indication of a component failure in the header of the session request, wherein the indication of the component failure indicates a non-responsive ENUM server. For example, the S-CSCF may insert an ENUM server failure indication in the header of a SIP INVITE message.

In step 335, method 300 forwards the session request to an I-CSCF in the domain of the S-CSCF. For example, the S-CSCF may forward the session request, with the header providing an indication of a non-responsive ENUM server, to the I-CSCF of the home domain of the calling party for further handling.

In optional step 340, method 300 receives a response to the session request indicating that the domain of the called party is not found. For example, the S-CSCF may receive a response to the session request from the I-CSCF indicating that no S-CSCF FDQN was found for the called party by the HSS of the home domain.

In optional step 345, method 300 forwards the session request to the Public Switched Telephone Network (PSTN). For example, if the called party is not in the home domain of the calling party, the S-CSCF may then forward the session request to the PSTN for completion. The method then ends in step 350 or returns to step 310 to continue receiving requests.

Figure 4:
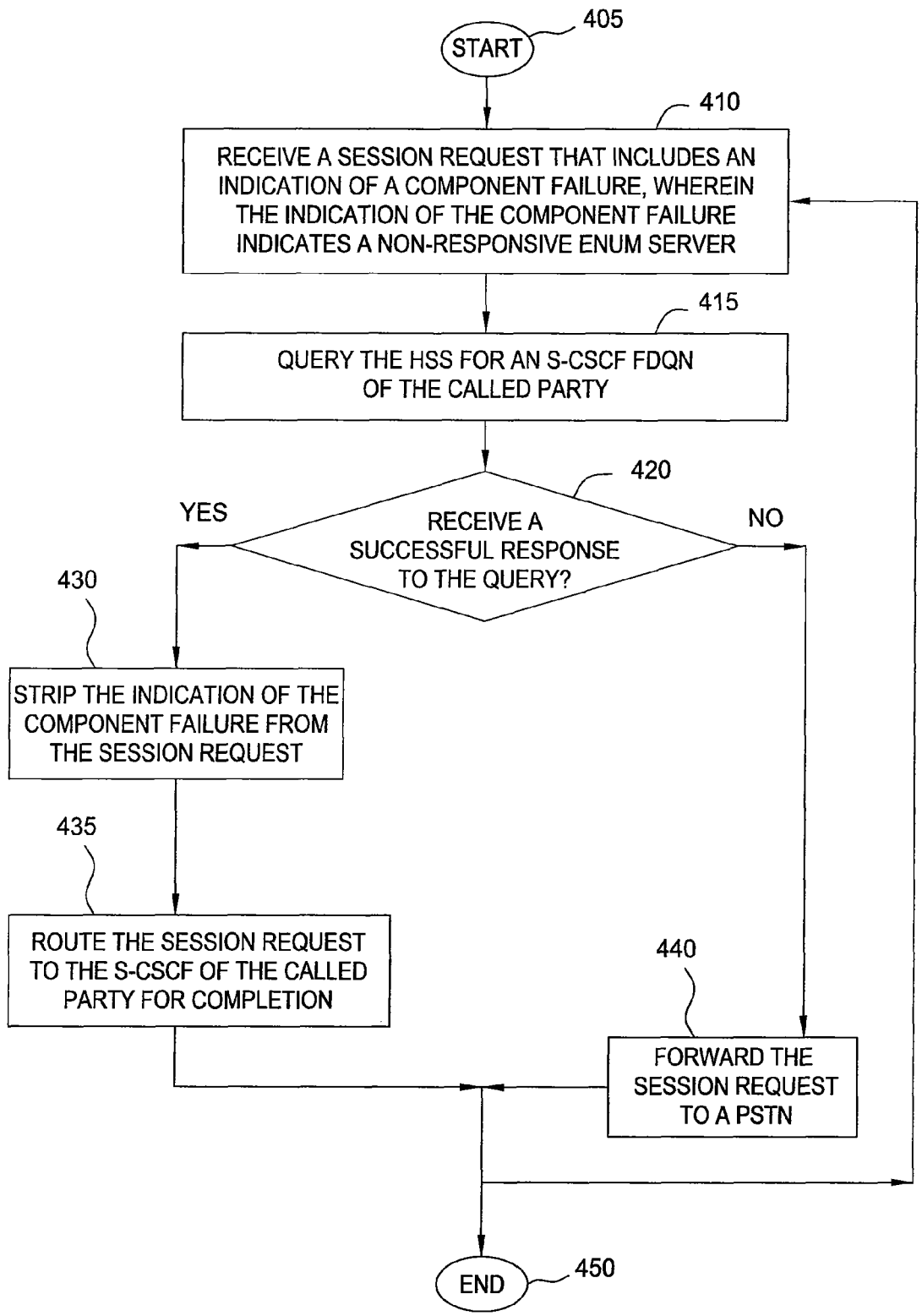
FIG. 4 illustrates a flowchart of a method for an l-CSCF completing a call in a network.

FIG. 4 illustrates a flowchart of a method 400 for an I-CSCF completing a call in a network. Method 400 starts in step 405 and proceeds to step 410.

In step 410, method 400 receives a session request that includes an indication of a component failure, wherein the indication of the component failure indicates a non-responsive ENUM server. For example, an I-CSCF may receive a SIP INVITE message from an S-CSCF that includes an indication of a non-responsive ENUM server.

In step 415, method 400 queries the HSS for an S-CSCF FDQN of the called party. For example, the I-CSCF may interrogate the HSS to determine the S-CSCF of the called party.

In step 420, method 400 determines if a successful response to the query is received from the HSS. For example, the method may determine if a response that includes the S-CSCF FDQN of the called party is received. If a successful response is received, then the method proceeds to step 430. Otherwise, the method proceeds to step 440.

In step 430, method 400 strips the indication of the component failure from the session request. For example, the method removes the ENUM failure indication from the header of the SIP INVITE message.

In step 435, method 400 routes the session request to the S-CSCF of the called party for completion. For example, the method may forward the session request in accordance with the received S-CSCF FDQN.

In step 440, method 400 forwards the session request directly to a Public Switched Telephone Network (PSTN) via a Border Gateway Control Function (BGCF) and/or a Media Gateway Control Function (MGCF). For example, the I-CSCF may forward the session request to the PSTN for completion. The method then ends in step 450 or returns to step 410 to continue receiving requests.

In one embodiment, the method 400 may forward the session request back to the S-CSCF of the calling party with an indication that the S-CSCF of the called party is not in the domain of the HSS. The S-CSCF may then perform the forwarding of the session request to the PSTN accordingly as discussed above in optional steps 340 and 345 of FIG. 3.

It should be noted that although not specifically specified, one or more steps of method 300 or 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 or FIG. 4 that recite a determining operation or involve a decision, do not necessarily require that both branches of the determining operation be practiced. In other words, one of the branches of the determining operation can be deemed as an optional step.

Figure 5:
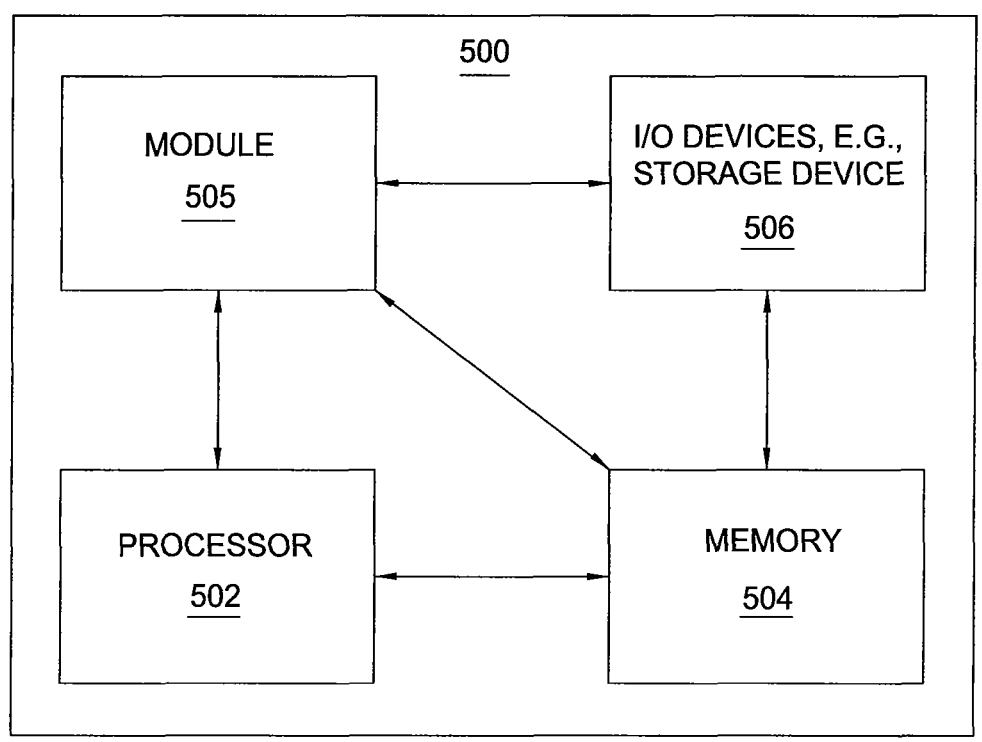
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for completing a call in a network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for completing a call in a network can be loaded into memory 504 and executed by processor 502 to implement the functions as discussed above. As such, the present method 505 for completing a call in a network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a session request in a network, comprising:
receiving, by a processor of a serving-call session control function, the session request, wherein the session request comprises an invite message;
sending, by the processor, a query to a telephone numbering mapping server for the session request;
determining, by the processor, if a response is received to the query to the telephone numbering mapping server;
inserting, by the processor, an indication of a component failure in a header of the session request when the response is not received from the telephone numbering mapping server, wherein the indication of the component failure indicates a non-responsive telephone numbering mapping server; and
forwarding, by the processor, the session request having the indication of the component failure to an interrogating-call session control function in a domain of the serving-call session control function.

2. The method of claim 1, further comprising:
processing the session request via a domain name server, when the response is received from the telephone numbering mapping server.

3. The method of claim 1, further comprising:
receiving a response to the session request from the interrogating-call session control function indicating that a domain of a called party of the session request is not found; and
forwarding the session request to a public switched telephone network.

4. The method of claim 1, wherein the invite message comprises a message to a called party from a calling party in accordance with a session initiation protocol.

5. The method of claim 1, wherein the query comprises a query for retrieving a naming authority pointer resource record associated with a called party.

6. The method of claim 1, wherein the network comprises an internet protocol multimedia subsystem network.

7. A non-transitory computer-readable medium storing a plurality of instructions which, when executed by a processor, cause the processor to perform operations for processing a session request in a network, the operations comprising:
receiving the session request by a serving-call session control function, wherein the session request comprises an invite message;
sending a query to a telephone numbering mapping server for the session request;
determining if a response is received to the query to the telephone numbering mapping server;
inserting an indication of a component failure in a header of the session request when the response is not received from the telephone numbering mapping server, wherein the indication of the component failure indicates a non-responsive telephone numbering mapping server; and forwarding the session request having the indication of the component failure to an interrogating-call session control function in a domain of the serving-call session control function.

8. The non-transitory computer-readable medium of claim 7, further comprising:
processing the session request via a domain name server, when the response is received from the telephone numbering mapping server.

9. The non-transitory computer-readable medium of claim 7, further comprising:
receiving a response to the session request from the interrogating-call session control function indicating that a domain of a called party of the session request is not found; and
forwarding the session request to a public switched telephone network.

10. The non-transitory computer-readable medium of claim 7, wherein the invite message comprises a message to a called party from a calling party in accordance with a session initiation protocol.

11. The non-transitory computer-readable medium of claim 7, wherein the query comprises a query for retrieving a naming authority pointer resource record associated with a called party.

12. The non-transitory computer-readable medium of claim 7, wherein the network comprises an internet protocol multimedia subsystem network.

13. A method for processing a session request in a network, comprising:
receiving, by a processor of an interrogating-call session control function from a serving-call session control function, the session request, wherein the session request comprises an indication of a component failure in a header of the session request, wherein the indication of the component failure indicates a non-responsive telephone numbering mapping server, wherein the session request comprises an invite message;
sending, by the processor, a query to a home subscriber server to obtain domain information of a called party of the session request; and
stripping, by the processor, the indication of the component failure in the header from the session request, and routing the session request in accordance with the domain information, when the domain information is received from the home subscriber server.

14. The method of claim 13, further comprising:
forwarding the session request to a public switched telephone network, when the domain information is not received from the home subscriber server.

15. The method of claim 13, further comprising:
forwarding the session request back to the serving-call session control function, when the domain information is not received from the home subscriber server.

16. The method of claim 13, wherein the domain information comprises serving-call session control function fully qualified domain name associated with the called party.

17. The method of claim 13, wherein the invite message comprises a message in accordance with a session initiation protocol.

18. The method of claim 13, wherein the network comprises an internet protocol multimedia subsystem network.

* * * * *